(12) United States Patent
McIntyre et al.

(10) Patent No.: US 6,549,194 B1
(45) Date of Patent: Apr. 15, 2003

(54) METHOD FOR SECURE PIN ENTRY ON TOUCH SCREEN DISPLAY

(75) Inventors: Keith Eric McIntyre, Roseville, CA (US); John Foxe Sheets, San Francisco, CA (US); Dominique Andre Jean Gougeon, Rocklin, CA (US); Curtis W. Watson, Aubrey, TX (US); Keven Paul Morlang, Fair Oaks, CA (US); Dave Faoro, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/410,397

(22) Filed: Oct. 1, 1999

(51) Int. Cl.[7] .................................................. G09G 5/00
(52) U.S. Cl. ...................................... 345/173; 340/5.4
(58) Field of Search ................................. 345/173, 177; 713/194, 183; 705/73, 18, 16, 25; 340/5.4, 5.26, 5.27, 5.54

(56) References Cited

U.S. PATENT DOCUMENTS

| | | | | |
|---|---|---|---|---|
| 4,333,090 A | * | 6/1982 | Hirsch | 380/52 |
| 4,857,914 A | * | 8/1989 | Thrower | 340/5.54 |
| 5,276,314 A | * | 1/1994 | Martino et al. | 340/5.27 |
| 5,508,692 A | * | 4/1996 | Wolfram | 340/5.26 |
| 5,768,386 A | * | 6/1998 | Yokomoto et al. | 713/183 |
| 5,815,083 A | * | 9/1998 | Patarin et al. | 340/5.27 |
| 5,949,348 A | * | 9/1999 | Kapp et al. | 340/5.4 |
| 5,970,146 A | * | 10/1999 | McCall et al. | 713/194 |
| 6,049,790 A | * | 4/2000 | Rhelimi | 705/73 |
| 6,317,835 B1 | * | 11/2001 | Bilger et al. | 713/194 |
| 6,434,702 B1 | * | 8/2002 | Maddalozzo et al. | 713/202 |

* cited by examiner

*Primary Examiner*—Steven Saras
*Assistant Examiner*—Uchendu O. Anyaso

(57) ABSTRACT

A method for operating a combination touch pad and display screen device as a PINpad for entering a A plurality of numerical keypad layouts for the display screen are defined. Each keypad layout has a unique arrangement of decimal number locations differing from one layout to all others. For each PIN entry event a random one of the numerical keypad layouts is selected and displayed on the display screen.

6 Claims, 5 Drawing Sheets

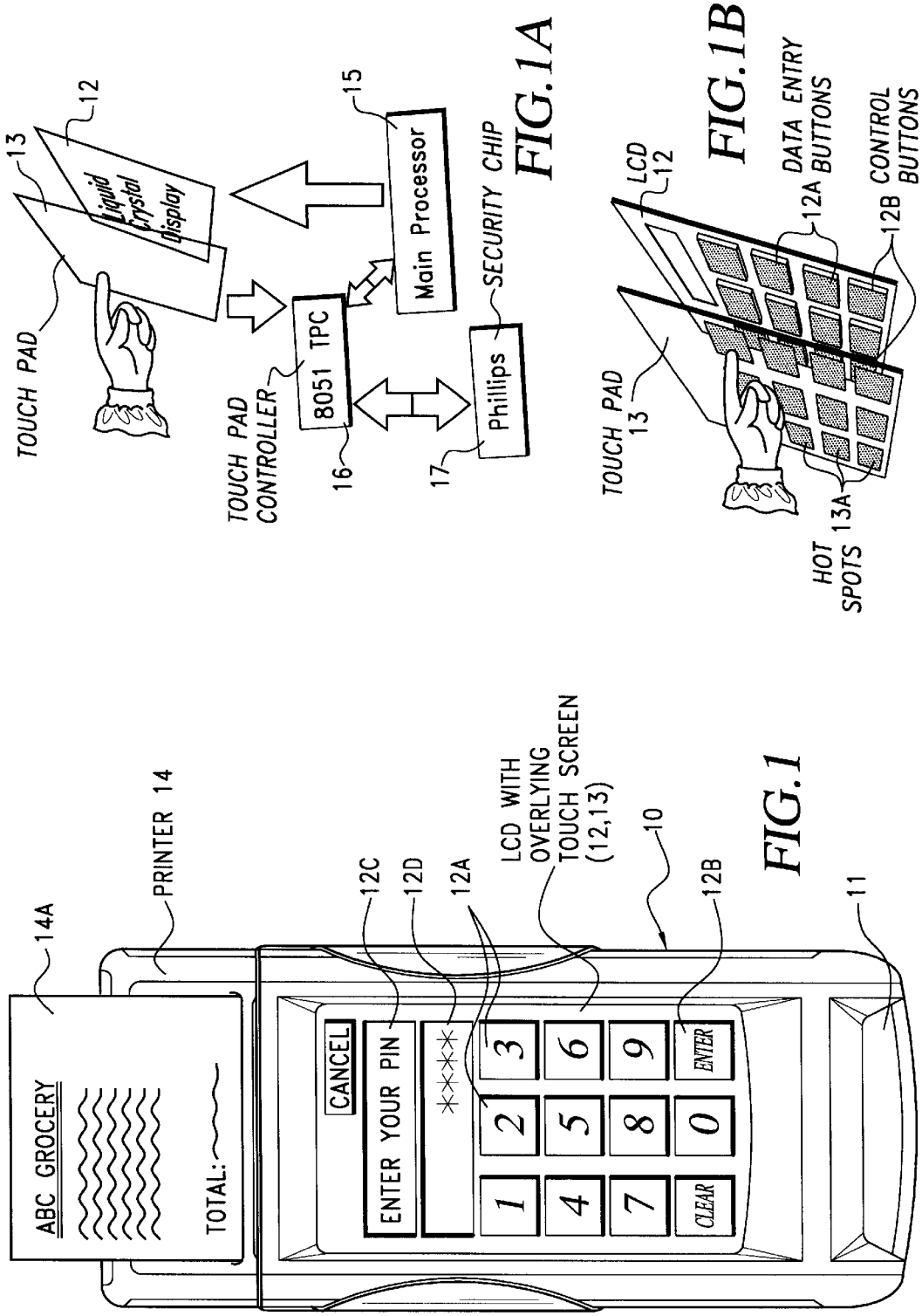

METHOD FOR SECURE PIN ENTRY ON TOUCH SCREEN DISPLAY

CROSS-REFERENCE TO RELATED APPLICATIONS

This application is related to co-pending and commonly assigned U.S. patent application Ser. No. 09/410,873, filed Oct. 1, 1999, and entitled "METHOD AND APPARATUS FOR TOUCH SCREEN DATA ENTRY". This related application is hereby incorporated by reference into this application.

FIELD OF THE INVENTION

This invention relates generally to data terminals which utilize a touch screen for data entry. This invention relates more particularly to data terminals which utilize a touch screen for PIN code entry.

BACKGROUND OF THE INVENTION

Touch screens for data entry on a computer terminal are well known in the art. A touch screen allows the user of a terminal to enter a menu selection or data by placing a finger or other object at a location on the display screen that corresponds to the menu item, function or data numeral to be entered. A touch sensitive element detects the coordinates of the touch event and the meaning of the touch event is determined by the coordinate location and the corresponding menu or data button displayed on the screen associated with the touch sensitive element.

When a touch screen is utilized to enter data such as a secret PIN number, it is vital that the PIN number be protected by encryption prior to being communicated to any external resource. Even if an encrypted PIN is utilized after PIN data is entered, the use of a touch screen for entry of a PIN code involves other risks that unscrupulous persons will be able to obtain the numerals of the PIN. For example, it may be possible for such persons to clean the touch screen prior to a particular target PIN entry and then analyze the fingermarks on the touch pad afterwards to determine the locations of the PIN entry touches and thus the numerals of the entered PIN.

Alternatively, such persons sight overlay the touch pad with another touch sensitive medium that detects the location and sequence of touches for later analysis to steal the target PIN.

Accordingly, utilizing a touch screen for entry of PIN data in a secure fashion present a difficult technical challenge.

OBJECTS OF THIS INVENTION.

It is a principal object of this invention to provide a more secure method for operating a touch screen device for entry of PIN data.

FEATURES AND ADVANTAGES OF THIS INVENTION.

This invention provides a secure method for operating a combination touch pad and display screen device as a PINpad for entering a confidential personal identification number by defining a plurality of numerical keypad layouts for the display screen, each of the layouts having a unique arrangement of decimal number locations differing from all other layouts. For each PIN entry event a random one of the numerical keypad layouts is selected and this random one of the numerical keypad layouts is displayed on the display screen. Using a random layout effectively prevents persons from stealing the PIN numerals by analyzing the touches on the touch screen after the fact of PIN entry, since there is no way to correlate touch locations with PIN numerals.

Preferably the method of this invention is carried out in a a combination touch pad and display screen device with the touch pad being controlled by a touch pad controller and having an associated security processor, and the display being controlled by an application processor in communication with the touch pad controller and the display screen. The plurality of defined numerical keypad layouts each include an ENTER control key and each has an associated touch pad hot spot arrangement which is stored in association with the touch pad controller. The application processor stores a set of display layouts corresponding to the plurality of numerical keypad layouts. The touch pad controller selects for each PIN entry event a random number in the number range corresponding to the plurality of numerical keypad layouts. The application processor displays on the display screen a data entry screen having a set of discretely labeled data entry buttons corresponding to the display layout associated with the random number. The touch pad controller sets a corresponding one of the touch pad hot spot arrangements associated with the random number, responds to a sequence of touch events corresponding to active data entry buttons in the touch pad hot spot arrangement by storing each of the associated PIN numerals, and responds to a touch event corresponding to the "ENTER" command button by encrypting the stored PIN numerals using the security processor and sending the encrypted PIN data to the application processor.

By using the touch pad controller and its associated security chip to select the random number and thus to control the numerical keypad layout and the associated hot spot arrangement, further security of PIN entry is achieved.

Other object, features and advantages of this invention will be apparent from the detailed description below taken in conjunction with the accompanying drawings.

BRIEF DESCRIPTION OF DRAWING FIGURES

FIG. 1 is a plan view of a portable transaction terminal in which the features of this invention may be utilized.

FIG. 1A is a block diagram of hardware elements useful in carrying out the method of this invention.

FIGS. 1B, 2A–2D, and 3A–3D are pictorial diagrams illustrating certain features of the method of this invention.

Figure 4:
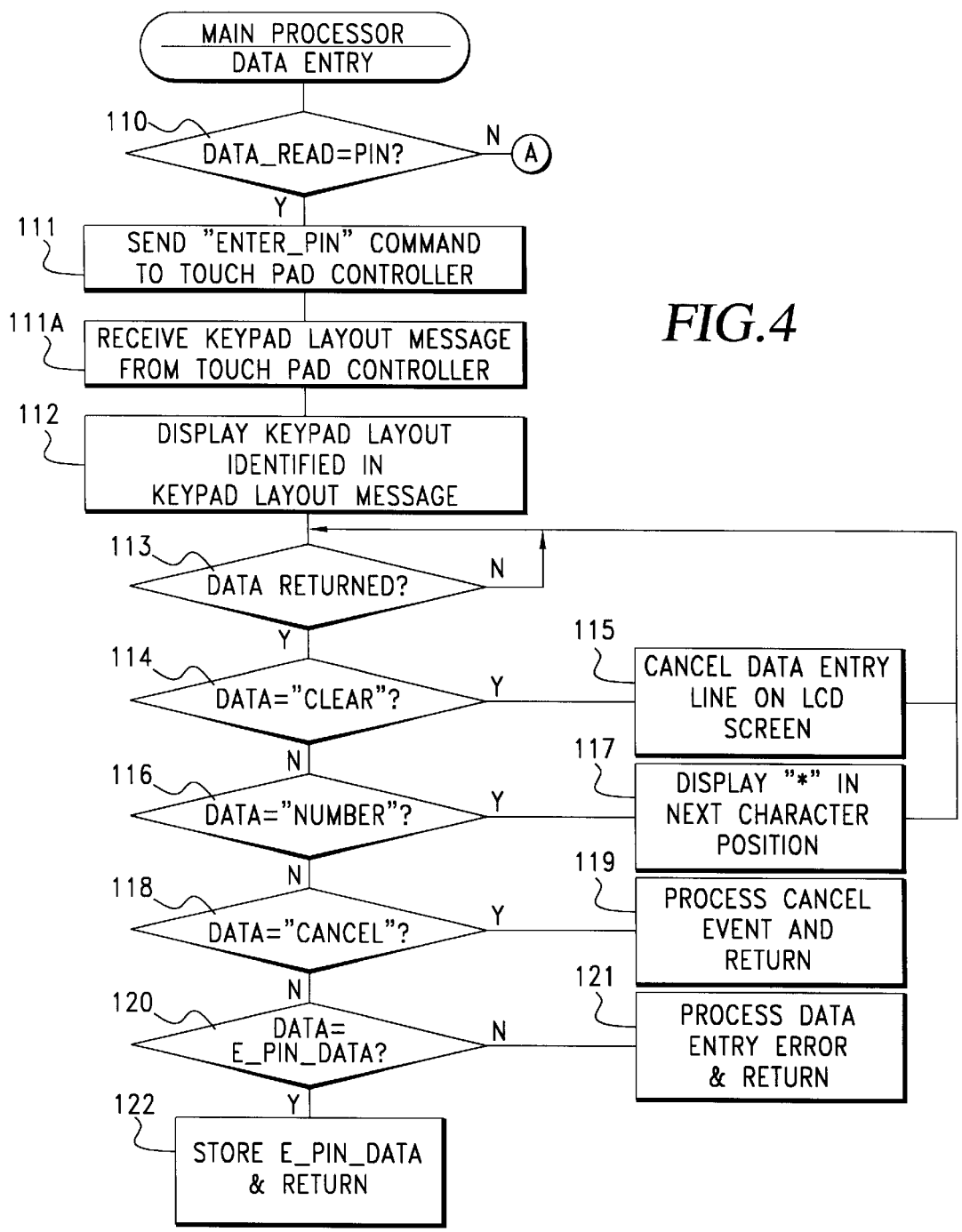
Figure 5:
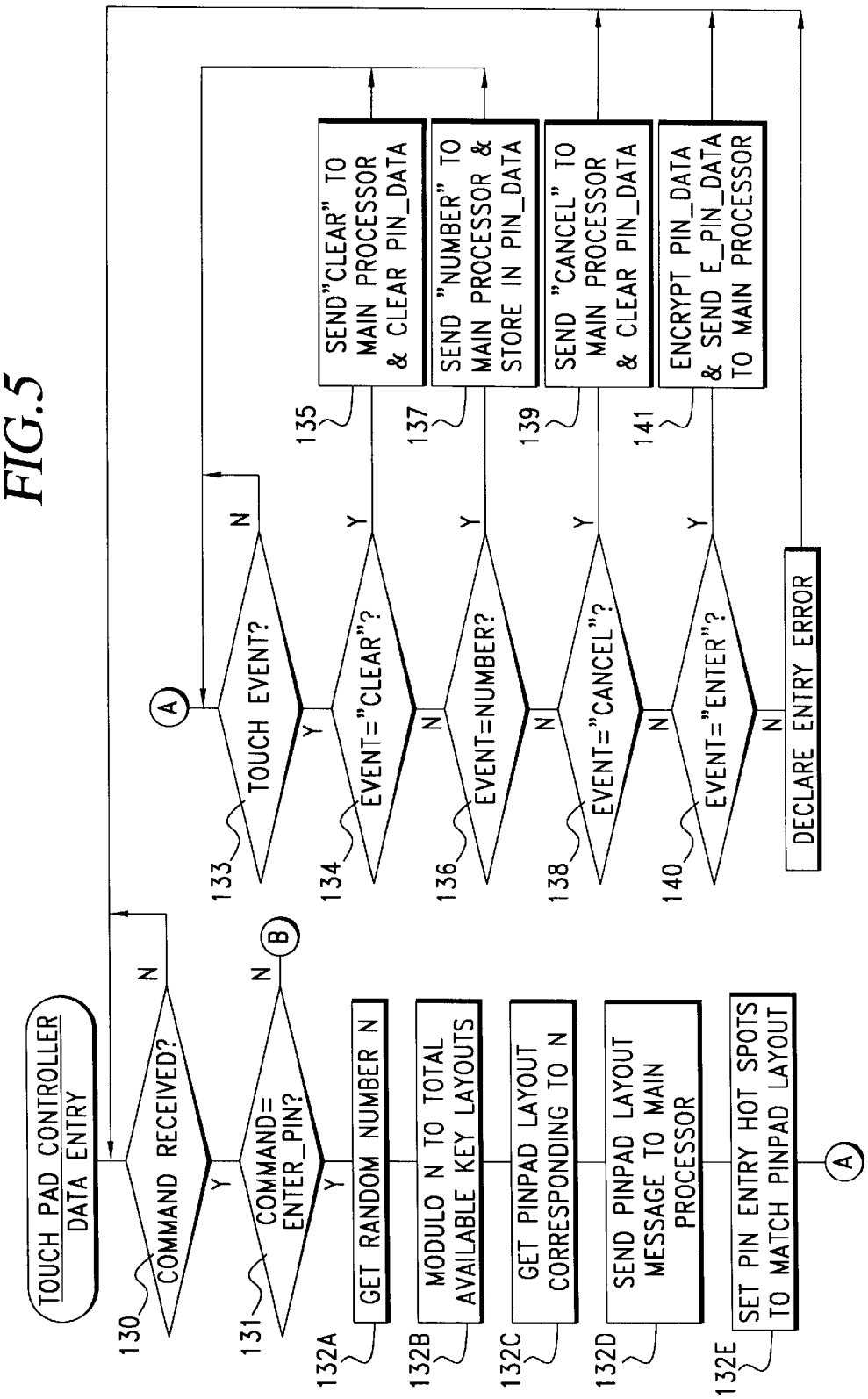

FIGS. 4 and 5 are software flow diagrams illustrating one embodiment of the method of this invention.

DETAILED DESCRIPTION OF INVENTION EMBODIMENTS

Referring now to FIGS. 1, 1A, 1B, 2A–2D and 3A–3D, features of the method of this invention will be discussed. This invention involves operating a combination of a touch pad 13 and a display screen 12 (preferably a liquid crystal display) as a PINpad for entering a confidential personal identification number. In one particular apparatus for carrying out this invention, touch pad 13 is coupled to and controlled by touch pad controller 16, display screen 12 is coupled to and controlled by application processor 15 (also called the main processor) which is in two-way data communication with touch pad controller 16. The above-referenced co-pending application includes a more detailed disclosure of the hardware components of a POS terminal in which this invention may be utilized.

According to the method of this invention, a plurality of numerical keypad layouts are defined for display screen 12, each layout having a unique arrangement of decimal number locations differing from one layout to all others. For each PIN entry event, a random one of these numerical keypad layouts is selected and displayed on the display screen. If hot spots are utilized for data entry, a corresponding hot spot layout for touch pad 13 is defined and set up in touch pad controller 16 for each keypad layout. It should be understood, however, that this invention is not limited to the use of hot spots.

By utilizing a different keypad layout each time that a PIN entry event is executed, theft of a customer's PIN number by detecting the location of touch events is frustrated. The location of the touch events may be detectable, but there is no way to tell which number is associated with each touch event without knowing which numerical keypad layout was utilized.

Figures 2A, 2B, 2C, 2D:
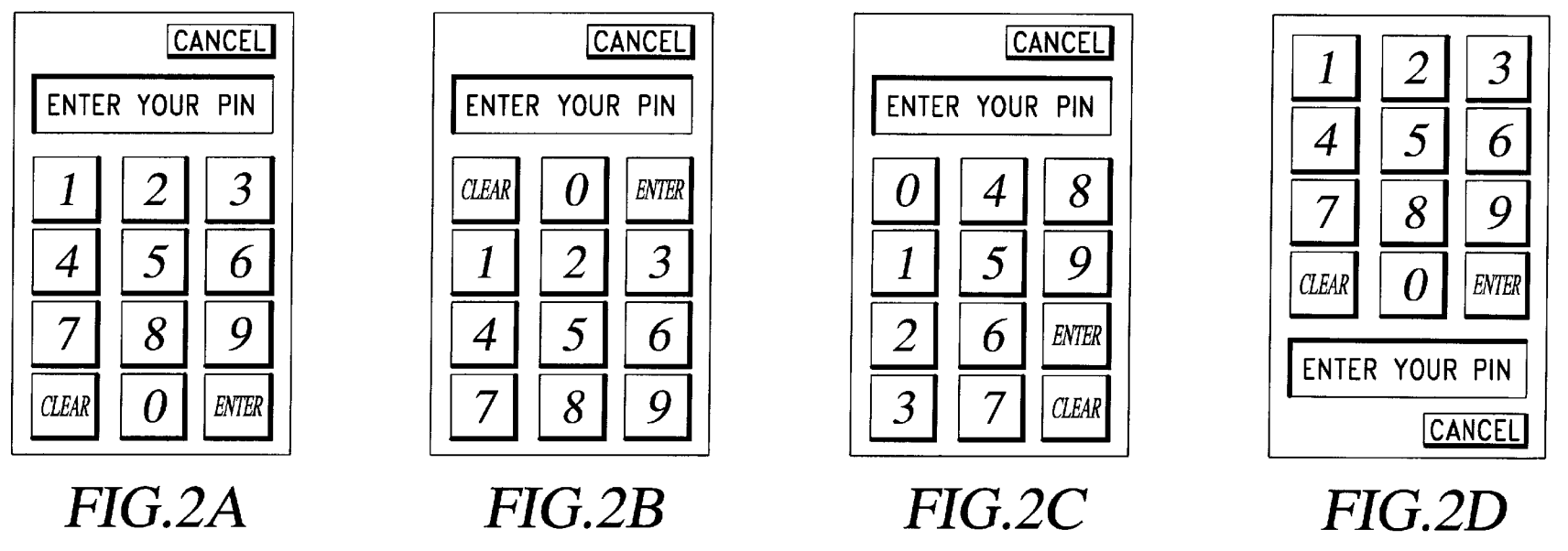

FIGS. 2A–2D illustrate one approach to defining a plurality of different numerical keypad layouts. FIGS. 2A–2C illustrate one case in which the key arrangements are the same in each layout, but the number and command associated with each key varies from one layout to the next. FIGS. 2A and 2D illustrate that other layout variations can also be employed such as changing the location of the keypad and message or data line sections of the layout.

Figure 3D:
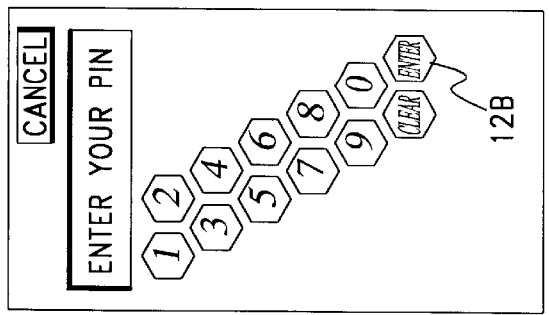
Figure 3C:
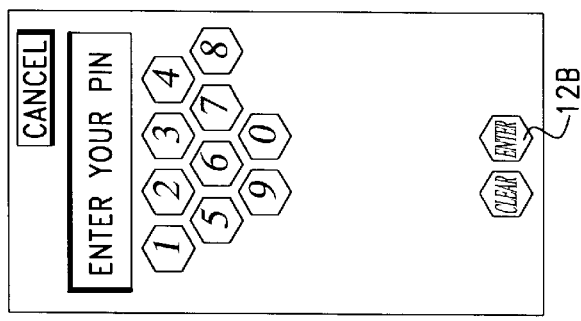
Figure 3B:
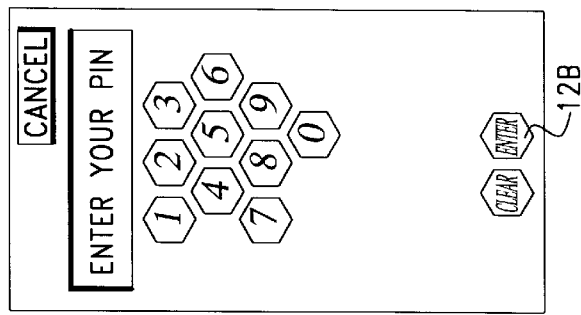
Figure 3A:
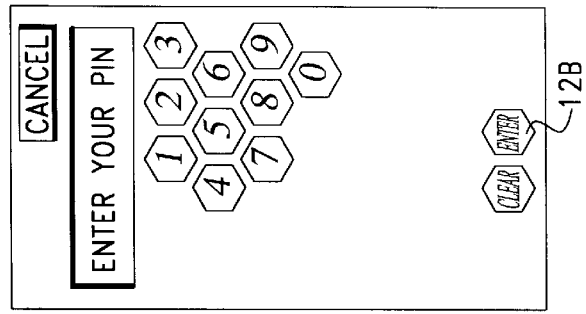

FIGS. 3A–3D illustrate another approach to defining a plurality of different numerical keypad layouts. As shown in FIG. 3A, a relatively large number of possible numerical key locations are provided on the display. Furthermore, each of the numerical keypad layouts may involve altering the placement and/or arrangement of the number keys.

Preferably, this invention involves a method for operating a combination touch pad 13 and display screen 12 device as a PINpad for entering a confidential personal identification number with touch pad 13 being controlled by a touch pad controller 15 which has an associated security processor 17. Display screen 12 is controlled by an application processor 15 which is in communication with the touch pad controller and the display screen. This arrangement of components is shown in FIG. 1A.

As before, a plurality of numerical keypad layouts for said display screen are defined and each has a unique arrangement of decimal number locations differing from one layout to all others. Each also has an ENTER key at a location differing from said decimal number locations. The method further involves storing in association with the touch pad controller a set of touch pad hot spot arrangements corresponding to the plurality of numerical keypad layouts and also storing in association with the application processor a set of display layouts corresponding to the plurality of numerical keypad layouts.

For each PIN entry event, a random number in the number range corresponding to the plurality of numerical keypad layouts is selected. Application processor 15 displays on the display screen a data entry screen having a set of discretely labeled data entry buttons corresponding to the display layout associated with the random number. Touch pad controller 16 sets a corresponding one of the touch pad hot spot arrangements associated with the random number and then responds to a sequence of touch events corresponding to active data entry buttons in that touch pad hot spot arrangement by storing each of the associated PIN numerals. After all the PIN numerals are entered and stored, touch pad controller 16 responds to a touch event corresponding to the "ENTER" command button by encrypting the stored PIN numerals using the security processor and sending the encrypted PIN data to the application processor.

Preferably, the random number selection is performed by touch pad controller 16 in conjunction with security chip 17 and touch pad controller 16 then sends a keypad layout message to application processor 15 so that application processor 15 can set up the keypad display that corresponds to the random number which touch pad controller 16 sets up the corresponding arrangement of hot spots related to the numerical keypad layout associated with the random number.

Referring now to FIGS. 4 and 5 one embodiment of software routines for touch screen PIN data entry running in a main processor, i.e. application processor 15, and touch pad controller 16, will be discussed. Reference to FIGS. 1, 1A and 1B will also be useful in understanding the steps of these software routines. FIGS. 4 and 5 are variations on the software routines disclosed in the above-referenced co-pending application and only the portions showing the steps for carrying out this invention are shown.

It should be understood that prior to executing these routines, the steps of defining numerical keypad layouts and storing appropriate sets of hot spot layouts and corresponding key layout screens will have been carried out.

PIN ENTRY

The program steps involved in PIN entry will now be discussed. Referring to FIG. 4 and a main processor routine designated "TOUCH SCREEN DATA ENTRY", checking step 110 determines if the data required is an encrypted PIN. If YES, application processor (main processor) 15 sends an ENTER_PIN command to touch pad controller 16 in step 111. In step 111A, application processor 15 receives back from touch pad controller 16 a keypad layout message which indicates which of the stored keypad layouts is to be displayed. Step 112 is then executed to display a PIN entry GUI on LCD 12 that corresponds to this selected keypad layout. Checking step 113 then checks for return of data from touch pad controller 16.

Now refer to FIG. 5, and a "DATA ENTRY" routine in touch pad controller 16. Checking step 130 tests for receipt of a command from application processor 15, and if YES, checking step 131 determines whether the command is an ENTER_PIN command. If YES, step 132A is executed to get a random number N. Step 132B involves a modulo operation on N to put it into the range of total available key layouts. Step 132C is executed to get the PIN-Pad layout corresponding to random number N. A PIN-Pad layout message is sent to application processor 15 in step 132D, and then step 132E set the PIN entry hotspot regions that match the PIN-Pad layout corresponding to random number R.

Checking step 133 checks for occurrence of a touch event, and when that step returns YES, checking steps 134, 136, 138, and 140 check which of the hot spots correspond to the touch event followed by an appropriate program action.

If the touch event is CLEAR, meaning that the user touched touch pad 13 shown in FIG. 1 at the CLEAR button (wherever located in the selected PIN-Pad layout), this jeans that the user wants to clear any prior entered data and start over with entering PIN data. So, if checking step 134 returns YES, touch pad controller 16 sends a "CLEAR" data message to application processor 15 and clears any previously entered numerals stored in its PIN_DATA register. Referring to the corresponding action in application processor 15 as shown in FIG. 4, checking step 114 detects that the returned data message is "CLEAR" and clears the data entry line of any asterisks representing previously entered numerals of the PIN.

If the touch event is not "CLEAR", checking step 134 returns NO, and checking step 136 executes to determine if the touch event is a number or numeral, i.e. whether the user has touched one of the numeral buttons 0–9 on the selected numerical keypad layout. If YES, touch pad controller 16 send a "NUMBER" message to application processor 15 and stores the corresponding numeral in its PIN_DATA register. The "NUMBER" message is not the numeral entered, but a message to application processor 15 that indicates that touch pad controller 16 has detected entry of a PIN numeral. Referring to checking step 116 in FIG. 4, when the data message from touch pad controller 16 to application processor 15 is "NUMBER", step 117 is executed to display an asterisk "*" in the next character position in the data entry display location on display screen 12.

If the touch event is not "CLEAR" or "NUMBER", checking step 138 is executed to determine if the event is "CANCEL". This checking step will return YES if the user has touched the CANCEL button. This means that the user wishes to cancel PIN entry altogether. If checking step 138 returns YES, step 139 is executed, and touch pad controller 16 sends a "CANCEL" message to main processor 15 and clears its PIN_DATA register. Referring to FIG. 4, checking step 118 will detect that the data message is "CANCEL" and application processor 15 will execute step 119 to process a cancel event and then return to start executing another program modules.

If the touch event is not "CLEAR" or "NUMBER" or "CANCEL", checking step 140 is executed to determine if it is an "ENTER" event as a result of the user touching the ENTER button on the PIN_Pad layout. If YES, step 141 is executed and the contents of PIN_DATA register is encrypted in security chip 17 and the resultant E_PIN_DATA is sent to main processor 15. Referring to FIG. 4, checking step 120 detects if the data from main processor 15 is E_PIN_DATA, and if YES, the E_PIN_DATA is stored and the program execution returns to another program module.

If the routine in FIG. 6A reaches step 142, a data entry error of some type as occurred and is declared and an ERROR is sent to main processor 15. If checking step 120 in FIG. 4 returns NO, then the data returned can only be "ERROR" and a data entry error is processed in step 121.

The normal sequence of PIN entry will be the user touching a sequence of numeral buttons 0–9 on touch pad 13, resulting in the loading of corresponding numerals into the PIN_DATA register (steps 136, 137 in FIG. 6A) and echoing of the numerals to the data entry line 12D as asterisks. (steps 116, 117 in FIG. 4). This would be followed by touching the ENTER button 12B, resulting in encryption of the PIN data in the PIN_DATA register and sending of E_PIN_DATA from touch pad controller 16 to main processor 15 (steps 140, 141 in FIG. 5; steps 120, 122 in FIG. 4).

Persons of skill in the art will appreciate that numerous other modifications to the method described above could be made without departing from the scope of this invention as defined in the following claims.

What is claimed is:

1. A method for operating a combination touch pad and display screen device as a PINpad for entering a confidential personal identification number, said touch pad being controlled by a touch pad controller and having an associated security processor, said display being controlled by an application processor in communication with said touch pad controller and said display screen, said method comprising the steps of:
   a. defining a plurality of numerical keypad layouts for said display screen, each having a unique arrangement of decimal number locations differing from one layout to all others, and each having an ENTER key at a location differing from said decimal number locations;
   b. storing in association with said touch pad controller a set of touch pad hot spot arrangements corresponding to said plurality of numerical keypad layouts;
   c. storing in association with said application processor a set of display layouts corresponding to said plurality of numerical keypad layouts;
   d. said touch pad controller selecting for each PIN entry event a random number in the number range corresponding to said plurality of numerical keypad layouts said touch pad controller responding to said PIN data entry command by executing the steps of: selecting a random number in the number range corresponding to said plurality of numerical keypad layouts wherein the touch pad controller sends a keypad layout message to said application processor corresponding to said random number;
   e. said application processor displaying on said display screen a data entry screen having a set of discretely labeled data entry buttons corresponding to the one of said set of display layouts associated with said random number; and
   f. said touch pad controller carrying out the steps of:
      f.1 setting a corresponding one of said touch pad hot spot arrangements associated with said random number;
      f.2 responding to a sequence of touch events corresponding to active data entry buttons in said touch pad hot spot arrangement by storing each of the associated PIN numerals; and
      f.3 responding to a touch event corresponding to said "ENTER" command button by encrypting said stored PIN numerals using said security processor and sending the encrypted PIN data to said application processor.

2. A method for operating a combination touch pad and display screen device as a secured data entry device in a point-of-sale transaction environment in which secret PIN entries are required, said touch pad being controlled by a touch pad controller with an associated security processor and being located within a security module for protection against intrusion, said display being controlled by an application processor in communication with said touch pad controller and said display screen, said method comprising the steps of:
   defining a plurality of numerical keypad layouts for said display screen, each having a unique arrangement of decimal number locations differing from one layout to all others of said layouts and having at least an "ENTER" command button;
   storing in memory associated with said application processor indicia of each of said plurality of numerical keypad layouts;
   storing in memory associated with said touch pad controller indicia of a hot spot layout corresponding to each of said plurality of numerical keypad layouts;
   said application processor sending to said touch pad controller a PIN data entry command requesting execution of a PIN entry touch event routine and, upon receipt of a keypad layout message from said touch pad controller, displaying on said display screen device one of said numerical keypad layouts corresponding to said keypad layout message;

said touch pad controller responding to said FIN data entry command by executing the steps of:

selecting a random number in the number range corresponding to said plurality of numerical keypad layouts;

sending a keypad layout message to said application processor corresponding to said random number;

setting a corresponding one of said touch pad hot spot arrangements associated with said random number;

responding to a sequence of touch events on hot spots corresponding to active data entry buttons by storing each of the associated PIN numerals; and responding to a touch event corresponding to said "ENTER" command button by encrypting said stored PIN numerals using said security processor and sending the encrypted PIN data to said application processor.

3. A method for operating a device including a touch pad, a display screen, and a touch pad controller, as a device for entering confidential personal information, said touch pad controller being connected to an application processor external to said device, said application processor executing application programs to control said display screen, and said touch pad controller arranged to receive signals from said touch pad indicative of the locations of touches, said method comprising the steps of:

a. storing in association with said touch pad controller a plurality of numerical keypad layouts;

b. storing in association with said application processor a set of display layouts corresponding to said plurality of numerical keypad layouts;

c. when an application program executed by said application processor requires entry of confidential information through said touch pad, causing the application processor to inform the touch pad controller of the information entry requirement;

d. causing the touch pad controller to generate a random number, retrieve one of said plurality of numerical keypad layouts associated with said random number, and send a keypad layout message to the application processor;

e. causing the application processor to display one of said display layouts corresponding to said one of said plurality of numerical keypad layouts associated with said random number;

f. causing the touch pad controller to correlate locations of touches with said confidential information based on the retrieved keypad layout data; and g. sending the confidential information from the touch pad controller to the application processor.

4. A method as claimed in claim 3, wherein said confidential information is a PIN.

5. A method as claimed in claim 4, wherein said PIN is encrypted by said touch pad controller before the PIN is sent to the application processor.

6. A method as claimed in claim 3, wherein said confidential information is encrypted by said touch pad controller before the touch pad controller sends said confidential information to said application processor.

\* \* \* \* \*

UNITED STATES PATENT AND TRADEMARK OFFICE
CERTIFICATE OF CORRECTION

PATENT NO. : 6,549,194 B1
DATED : April 15, 2003
INVENTOR(S) : Keith Eric McIntyre et al.

It is certified that error appears in the above-identified patent and that said Letters Patent is hereby corrected as shown below:

Column 7,
Line 6, delete "FIN" and insert therefor -- PIN --

Signed and Sealed this

Twelfth Day of October, 2004

JON W. DUDAS
*Director of the United States Patent and Trademark Office*